US009684850B2

(12) United States Patent
Saito et al.

(10) Patent No.: US 9,684,850 B2
(45) Date of Patent: Jun. 20, 2017

(54) BIOLOGICAL INFORMATION PROCESSOR

(75) Inventors: Hiroo Saito, Tokyo (JP); Hiroshi Sukegawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 13/614,377

(22) Filed: Sep. 13, 2012

(65) Prior Publication Data
US 2013/0243278 A1    Sep. 19, 2013

(30) Foreign Application Priority Data

Mar. 19, 2012 (JP) ................................. 2012-061976

(51) Int. Cl.
G06K 9/03 (2006.01)
G06K 9/62 (2006.01)
G06K 9/00 (2006.01)

(52) U.S. Cl.
CPC ....... *G06K 9/6247* (2013.01); *G06K 9/00281* (2013.01); *G06K 9/036* (2013.01)

(58) Field of Classification Search
CPC ...... G06K 9/036; G06K 9/46; G06K 9/00281; G06K 9/0061; G06K 9/00228; G06K 9/00523; G06K 9/60; G06K 9/00268; G06K 9/00885; G06K 9/00248; G06K 9/00275; G06K 9/0014; G06K 9/00597; G06K 9/6202; G06K 9/00221; G06K 9/00288; G06K 9/00295; G06K 2009/363; G06T 2207/30201

See application file for complete search history.

(56) References Cited

U.S. PATENT DOCUMENTS

| 5,933,527 | A  | * | 8/1999  | Ishikawa ........................ 382/190 |
| 5,982,912 | A  | * | 11/1999 | Fukui et al. ................... 382/118 |
| 6,567,765 | B1 | * | 5/2003  | Wu et al. ....................... 702/182 |
| 6,580,821 | B1 | * | 6/2003  | Roy .............................. 382/154 |
| 6,633,655 | B1 | * | 10/2003 | Hong et al. .................... 382/118 |
| 7,007,298 | B1 | * | 2/2006  | Shinzaki et al. ................. 726/3 |

(Continued)

FOREIGN PATENT DOCUMENTS

| JP | H01-158579 A | 6/1989 |
| JP | 05225344     | 9/1993 |

(Continued)

OTHER PUBLICATIONS

Translated version of JP 09-006964.*

(Continued)

*Primary Examiner* — Sumati Lefkowitz
*Assistant Examiner* — Carol Wang
(74) *Attorney, Agent, or Firm* — Baker Botts L.L.P.

(57) ABSTRACT

According to one embodiment, a biological information processor includes: an area detection unit configured to detect an area in which a person is displayed from image information; a feature extraction unit configured to extract feature information based on a characteristic portion of a person from the area detected by the area detection unit from the image information; and a determination unit configured to determine an extraction precision indicating whether or not the characteristic portion of the person can be extracted, with respect to the feature information extracted by the feature extraction unit based on a position of the characteristic portion.

7 Claims, 15 Drawing Sheets

(56) References Cited

U.S. PATENT DOCUMENTS

| | | | |
|---|---|---|---|
| 7,502,496 B2* | 3/2009 | Kozakaya | G06K 9/00228 382/115 |
| 2004/0062425 A1* | 4/2004 | Uchida | 382/124 |
| 2004/0086157 A1* | 5/2004 | Sukegawa | 382/115 |
| 2004/0136574 A1* | 7/2004 | Kozakaya et al. | 382/118 |
| 2006/0045382 A1* | 3/2006 | Adachi | G06K 9/00248 382/291 |
| 2006/0078170 A1* | 4/2006 | Kamata | G06K 9/00 382/115 |
| 2006/0204053 A1* | 9/2006 | Mori et al. | 382/118 |
| 2006/0269143 A1* | 11/2006 | Kozakaya | G06K 9/00288 382/218 |
| 2007/0050639 A1* | 3/2007 | Nakano | G06K 9/00281 713/186 |
| 2007/0071317 A1* | 3/2007 | Kubo et al. | 382/167 |
| 2007/0071440 A1* | 3/2007 | Kagaya | G06T 5/007 396/661 |
| 2007/0189585 A1* | 8/2007 | Sukegawa et al. | 382/118 |
| 2008/0075378 A1* | 3/2008 | Kim | G06K 9/036 382/252 |
| 2008/0130961 A1* | 6/2008 | Kinoshita | 382/118 |
| 2008/0193020 A1 | 8/2008 | Sibiryakov et al. | |
| 2009/0060290 A1* | 3/2009 | Sabe | G06K 9/00248 382/118 |
| 2009/0147141 A1* | 6/2009 | Lee | G06K 9/00221 348/576 |
| 2009/0175512 A1* | 7/2009 | Hyuga et al. | 382/118 |
| 2009/0324020 A1* | 12/2009 | Hasebe | G06K 9/00228 382/115 |
| 2010/0254579 A1* | 10/2010 | Lee | G06K 9/036 382/124 |
| 2011/0129127 A1* | 6/2011 | Yang | G06K 9/00248 382/118 |
| 2012/0269389 A1* | 10/2012 | Nakano et al. | 382/103 |
| 2012/0321145 A1 | 12/2012 | Saito | |

FOREIGN PATENT DOCUMENTS

| | | | |
|---|---|---|---|
| JP | 09006964 A | * 1/1997 | G06T 7/60 |
| JP | 2004-118627 A | 4/2004 | |
| JP | 2008117333 A | 5/2008 | |
| JP | 2008-530701 A | 8/2008 | |
| JP | 2009211177 A | 9/2009 | |
| JP | 2010-040011 A | 2/2010 | |
| JP | 2012018593 A | 1/2012 | |
| JP | 2013003964 A | 1/2013 | |
| WO | 2011148596 A1 | 12/2011 | |

OTHER PUBLICATIONS

Office Action issued in related Korean Patent Application No. 10-2012-0101330, mailed Jul. 25, 2013, 4 pages.

Office Action issued in related Japanese Application No. 2012-061976, mailed Jul. 21, 2015 (6 pages with translation).

Office Action issued in related Japanese Application No. 2012-061976, mailed Feb. 9, 2016 (6 pages with tanslation).

* cited by examiner

BIOLOGICAL INFORMATION PROCESSOR

CROSS-REFERENCE TO RELATED APPLICATIONS

This application is based upon and claims the benefit of priority from Japanese Patent Application No. 2012-061976, filed on Mar. 19, 2012, the entire contents of which are incorporated herein by reference.

FIELD

Embodiments described herein relate generally to a biological information processor.

BACKGROUND

Heretofore, techniques for performing matching of a person based on the feature and state of biological information (for example, the state of a face or a hand) of an authenticated person have been developed. To carry out authentication, if feature points are not appropriately detected from image data representing the biological information of the authenticated person, there is a possibility that the matching precision is adversely affected.

For this reason, a technique for improving the precision of extracting feature points has been proposed in recent years.

However, even when the extraction precision is improved in the related art, there is a possibility that an error occurs in the detection of feature points. Accordingly, it is desirable to check whether the detection of feature points is appropriate and to confirm whether the quality of the detection is appropriate for matching processing.

DETAILED DESCRIPTION

A biological information processor according to an embodiment includes an area detection unit, a feature extraction unit, and a determination unit. The area detection unit detects an area in which a person is displayed from image information. The feature extraction unit extracts feature information based on a characteristic portion of a person from the area detected by the area detection unit from the image information. The determination unit determines an extraction precision indicating whether or not the characteristic portion of the person can be extracted, with respect to the feature information extracted by the feature extraction unit, based on the position of the characteristic portion.

The biological information processor according to an embodiment includes a storage unit and a similarity determination unit. The storage unit stores feature information for authentication based on the position representing the characteristic portion of the person extracted from prepared image information. The similarity determination unit calculates a similarity between the feature information based on the position representing the characteristic portion of the person included in the image information and the feature information for authentication stored in the storage unit, and determines the extraction precision of the feature information for authentication from the similarity.

Figure 1:
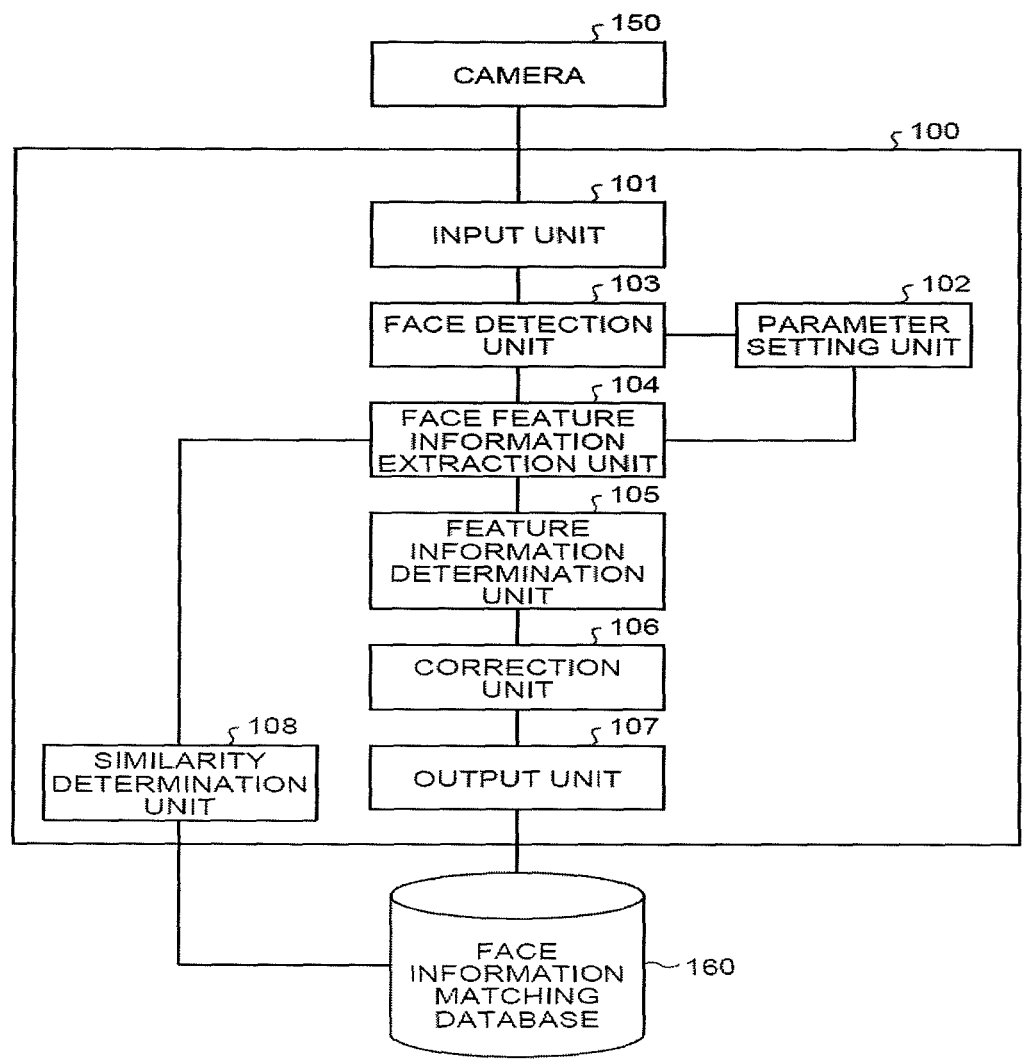
FIG. 1 is an exemplary block diagram illustrating a configuration of a biological information processor according to a first embodiment.

FIG. 1 is a block diagram illustrating the configuration of a biological information processor according to a first embodiment. A biological information processor 100 according to this embodiment includes an input unit 101, a parameter setting unit 102, a face detection unit 103, a face feature information extraction unit 104, a feature information determination unit 105, a correction unit 106, an output unit 107, and a similarity determination unit 108, and is connected to a camera 150. The image data captured by the camera may be moving image data or still image data.

The biological information processor 100 according to this embodiment extracts feature information of the face from the image data received from the camera 150, and registers the feature information in a face information database for matching used in matching. Though this embodiment illustrates an example for extracting feature information from a face, the embodiment is not limited to the extraction of feature information from a face and can also be applied to image data representing biological information other than a face. Examples of the biological information to be applied include states of an iris, a retina, a vein pattern of a hand or a finger, a fingerprint pattern, an eye, an ear, and a mouth. A plurality of these states may be used, or any one of these status may be used for authentication.

The biological information processor 100 according to this embodiment can be applied in the case of searching a specific person from a large number of personal image data items stored in the face information database for matching, for example. For example, the biological information processor 100 registers the feature information based on a large number of face image data items collected from a monitoring video captured by the camera 150, in the face information matching database, thereby enabling matching and search of a specific person using the face information matching database.

Incidentally, in the case of detecting feature points as feature information of the face from the image data included in the monitoring video, the feature points may be shifted or cannot be detected during processing. If such feature information is directly registered, an error may occur during matching. Accordingly, it is desirable to confirm the validity of the detection of feature points upon registration and to correct the feature points as needed. However, the manual correction is burdensome. In this regard, the biological information processor 100 according to this embodiment executes the confirmation of the validity and the correction as needed.

The input unit 101 performs processing of inputting image data including the face of a person from the image capturing means such as the camera 150. This embodiment illustrates an example of inputting image data from the camera 150. However, the image capturing means is not limited to the camera 150, but a scanner or the like may be used, for example. The image data subjected to the input processing by the input unit 101 is converted into digital data by an A/D converter (not illustrated), and the digital data is output to the face detection unit 103 and the face feature information extraction unit 104.

The parameter setting unit 102 sets parameters for the face detection unit 103, which is described later, to detect the area of the face.

The parameter setting unit 102 sets parameters for the face feature information extraction unit 104, which is described later, to detect feature points of a face. In this embodiment, a plurality of face feature points for one face is detected (for example, 14).

In this embodiment, various types of parameters with different conditions are set to each of the face detection unit 103 and the face feature information extraction unit 104. This allows extraction of feature information of various types of faces. In this embodiment, among the extracted feature information items of a plurality of faces, the feature information determined to have a highest extraction precision is registered, for example.

In this embodiment, at least one of the number of repetitions of processing for searching a position of a face portion, an image magnification, a dictionary for component detection, a filter size, and a layout model for each face direction is used as various types of parameters to be set. Then, a set of $\phi 1, \ldots,$ and $\phi N$ including various parameter values is obtained. The parameter setting unit 102 sets $\phi 1, \ldots,$ and $\phi N$ to the face detection unit 103 and the face feature information extraction unit 104, thereby generating N types of face feature information items. Note that the parameters to be set are illustrated by way of example only and other parameters may be used.

Furthermore, the parameter setting unit 102 sets a threshold for the feature information determination unit 105 to determine the feature information of the face. As the threshold to be set, two types of thresholds (a threshold for automatic setting and a threshold for manual setting) may be set. Note that a threshold for automatic setting $\theta 1>$a threshold for manual setting $\theta 2$. In the case of setting two types of thresholds, when the determination result exceeds the threshold for automatic setting $\theta 1$, the thresholds are output from the output unit 107 and automatically registered in a face information matching database 160. When the determination result is equal to or lower than the threshold for automatic setting $\theta 1$ and exceeds the threshold for manual setting $\theta 2$, manual registration into the face information matching database 160 after visual observation by a person, repeated detection of the face feature information, or the like is carried out. The threshold for automatic setting $\theta 1$ as well as the threshold for manual setting $\theta 2$ is set, thereby suppressing non-detection of a face.

The face detection unit 103 detects an area in which a face of a person is displayed from the input image data. The face detection unit 103 according to this embodiment detects the area of one or more faces from the input image data.

The face detection unit 103 according to this embodiment preliminarily stores a template for detecting the face in a storage unit which is not illustrated. Further, the face detection unit 103 calculates a correlation value while moving a prepared template within the input image data, and detects the area of the face based on the calculated correlation value. As a detection method according to this embodiment, the position where the correlation value becomes a local maximum value is detected as a feature point in this embodiment. Note that the method of detecting the face area is not limited and the detection may be carried out by using an eigen-space method or a subspace method, for example.

The face feature information extraction unit 104 extracts feature information based on a characteristic portion of a person from the area detected by the face detection unit 103. The face feature information extraction unit 104 according to this embodiment extracts the position of a face portion, such as an eye or a nose, as the face feature information.

The face feature information extraction unit 104 according to this embodiment extracts the position of a face portion, such as an eye or a nose, from the detected face area. As the detection method, any method may be employed. For example, a method proposed in the document (Kazuhiro Fukui, Osamu Yamaguchi: "Facial Feature Point Extraction Method Based on Combination of Shape Extraction and Pattern Matching", the Journal of the Institute of Electronics, information and communication (D), vol. J80-D-II, No. 8, pp. 2170-2177 (1997)) may be employed.

This embodiment illustrates an example of using face area features, but other biological features may be used. For example, images of an iris, a retina, and an eye may be extracted as feature information. In this case, the camera is zoomed on the eye area detected by the processing described above, thereby enabling detection of feature information.

The face feature information extraction unit 104 according to this embodiment extracts the area (position) of the mouth from the detected face area. As the method of extracting the area (position) of a mouth, a method proposed in the document (Mayumi Yuasa, Akiko Nakajima: "Digital Make System based on High-precision Facial Feature Point Detection" the 10th image sensing symposium proceedings, pp. 219-224 (2004)) may be employed, for example.

As the method of detecting a feature portion, an area representing a biological feature can be extracted from image data of two-dimensional array shape in any of the cases described above.

Unlike this embodiment, when the face feature information extraction unit 104 extracts only the area representing one biological feature from one image data item, a correlation value with a prepared template may be obtained for all areas of the image data, and the area having the position and size where the correlation value becomes maximum may be extracted. In the case of extracting a plurality of biological features, the local maximum value of the correlation value is obtained for all areas of the image data, candidate positions of the face are narrowed down in consideration of the superimposition in one image. In this case, a plurality of biological features can also be extracted in consideration of the relationship (temporal transition) with other image data consecutive in time sequence. In particular, when a plurality of biological features is detected simultaneously, more effects are likely to be obtained.

The face feature information extraction unit 104 cuts out the face area with a certain size and shape based on the position of the extracted biological feature, and the grayscale information is used as the feature information. In this embodiment, a grayscale value of an area having m pixels×n pixels is used as the feature information. Specifically, m×n-dimensional information is used as the feature vector. For example, in the case of employing simple similarity method as the method, normalization is carried out assuming that the vector and the length of the vector are set to "1", and an inner product is calculated, thereby calculating the similarity representing the similarity between feature vectors.

When the recognition result obtained from one image is satisfactory, the feature extraction is completed. However, a highly-precise recognition processing can be carried out by calculating from a moving image using a plurality of consecutive images. Accordingly, in this embodiment, the following processing is further carried out.

The face feature information extraction unit 104 according to this embodiment cuts out an image having m×n pixels by the above-described method from the image data successively obtained from the input unit 101. After that, the face feature information extraction unit 104 obtains a correlation matrix of the feature vectors for the data, and obtains a normal orthogonal vector by K-L development. Thus, the face feature information extraction unit 104 calculates the subspace representing the feature of the face obtained by successive image data. As the subspace calculation method, a correlation matrix (or a covariance matrix) of the feature vectors is obtained, and a normal orthogonal vector (eigenvector) is obtained by the K-L development. Thus, the subspace is calculated. The subspace is expressed by an eigenvector set after selecting k eigenvectors corresponding to the eigen values in descending order of the eigen values. In this embodiment, a correlation matrix Cd is calculated from the feature vector, and a correlation matrix $Cd = \phi \Lambda d \phi d\ T$ is diagonalized to obtain an eigenvector matrix $\phi$. This matrix $\phi$ serves as a subspace indicating a feature of a face of a person to be currently recognized.

When a plurality of faces has been detected, similar processing may be repeated for each of four A to D pedestrians to thereby calculate subspaces A to D. The calculated subspaces A to D may be registered in the face information matching database 160 as the face feature information.

The face feature information extraction unit 104 according to this embodiment extracts the feature information based on a characteristic portion of a person by the method described above. However, other methods may also be employed.

The face feature information extraction unit 104 according to this embodiment extracts N types of feature information items (including a plurality of feature points of a mouth, a nose, an eye, and the like for each feature information) for each detected person from the image data according to the parameter set by the parameter setting unit 102.

The feature information determination unit 105 determines the extraction precision of the feature information extracted by the face feature information extraction unit 104, based on the position where a characteristic portion of a person is detected. Thus, in this embodiment, the quality of the feature information is evaluated. Note that the extraction precision represents a degree indicating whether or not a characteristic portion of a person can be detected in the feature information.

The feature information determination unit 105 according to this embodiment determines the extraction precision of each of N types of feature information items extracted for each person. Thus, the feature information having the highest extraction precision can be specified. In this embodiment, the feature information having the highest extraction precision is registered in the face information matching database 160.

When the feature information determination unit 105 determines that the extraction precision is determined as improper, the correction unit 106 corrects at least one of the image data, the face area, and the feature information.

The output unit 107 outputs, in a manner associated with each other, the face feature information extracted by the face feature information extraction unit 104 and the image data from which the feature information is extracted, to the face information matching database 160. Further, the output unit 107 may display the image data from which the feature information is extracted, as a list. In this case, a list of successful or unsuccessful candidates of the registration may be displayed based on the determination result obtained by the feature information determination unit 105. Further, the output unit 107 may display a value representing an extraction precision, display a log of correction work, or output video or sound in neighborhood or distant devices.

The face information matching database 160 stores, in a manner associated with each other, information identical with the feature information input to identify a person and the image data from which the feature information is extracted. The face information matching database 160 according to this embodiment stores a feature vector m×n as the feature information. Alternatively, image data of the face area before feature extraction, or a correlation matrix obtained immediately before the subspace or K-L development to be used may also be employed.

The face information matching database 160 stores, in a manner associated with each other, the feature information and image data and the individual identification ID. This enables searching of the feature information and image data by using an individual identification ID as a key. The face information matching database 160 may store one or more feature information items for one person. In the case of storing a plurality of feature information items, the same person can be recognized at the time of switching of the camera or the like depending on the state (for example, movement of a person).

In this embodiment, it is difficult to control the registration conditions, and more effects can be obtained in different conditions. Accordingly, an example in which one feature information item is managed for each user is described. However, in this embodiment, there is no limitation on the storage of a plurality of feature information items for each person, and it is obvious that the storage of a plurality of feature information items for each person is effective for authentication of images of the faces of pedestrians who are walking separately.

Any registration method may be employed. For example, the output unit 107 can display, in a manner associated with each other, face feature information captured in each monitoring area and image data of each face, as a list of histories, and can register the information in the face information matching database 160 when selection of a person to be registered from the list is accepted from the user.

The similarity determination unit 108 determines whether the person included in the image data captured by the camera 150 is similar to the person registered in the face information matching database 160.

For example, the similarity determination unit 108 according to this embodiment compares similarity of the input subspace obtained by the face detection unit 103 and at least one of a plurality of subspaces registered in the face information matching database 160, thereby enabling determination as to whether preliminarily registered persons are present in the current image. When a plurality of persons is present, the similarity determination unit 108 can recognize all persons present in the screen by repeating the processing by the number corresponding to the number of persons detected.

As a calculation method for obtaining the similarity between subspaces, a method such as a subspace method or a multiple similarity method may be employed. As the recognition method in this embodiment, mutual subspace methods disclosed in the documents (Kazuhiro Fukui, Osamu Yamaguchi, Kenichi Maeda: "Face Recognition System using Temporal Image Sequence", the Institute of Electronics, information and communication Technical Report PRMU, vol. 97, No. 113, pp. 17-24 (1997); Kenichi Maeda, Sadakazu Watanabe: "Pattern Matching Method with Local Structure", Proceedings of the Institute of Electronics, information and communication (D), vol. J68-D, No. 3, pp. 345-352 (1985)) are employed.

In the method, recognition data included in preliminarily stored register information and input data are also expressed as subspaces calculated from a plurality of images, and an "angle" formed between two subspaces is defined as a similarity. Note that the input subspaces are referred to as input means subspaces. A correlation matrix Cin is obtained in the same manner for an input data string, and is diagonalized as $Cin=\phi in \Lambda in \phi inT$, thereby obtaining an eigenvector $\phi in$. A similarity (0.0 to 1.0) between the subspaces represented by two values $\phi in$ and $\phi d$ is obtained, and this is defined as the similarity for recognition. When there is a plurality of faces in the image, the similarity to each face image stored in the registered face feature management means is calculated for all persons in order, thereby obtaining results for all persons.

In the case where Y persons are registered in the face information matching database 160 when X persons walk, the similarity determination unit 108 calculates the similarity X*Y times, thereby making it possible to output results of all the X persons. Further, when the recognition result cannot be output with the calculation result obtained by inputting m image data items (when any registrant is not determined to match, and the subsequent frame is acquired and calculated), the similarity determination unit 108 adds the correction matrix to be input to the subspaces described above, to the sum of correlation matrices obtained by producing the one frame by a plurality of previous frames, thereby enabling recalculation of eigenvectors, creation of subspaces, and update of the subspaces on the input side.

That is, in the case of continuously capturing and collating face images of pedestrians, the matching is calculated while obtaining image data one by one and updating the subspace, thereby enabling calculations with increasing precision.

This embodiment has been described assuming that a plurality of image data items is input. However, as disclosed in the document (TOSHIBA CORPORATION (Tatsuo Kozakaya): "Image Recognition Apparatus, Method, and Program" JP-A-2007-4767), image data is created by intentionally varying the direction or state of a face by using a model for one face image data item, thereby making it possible to perform the processing similar to that of the mutual subspace method used in the first matching system.

Figure 2:
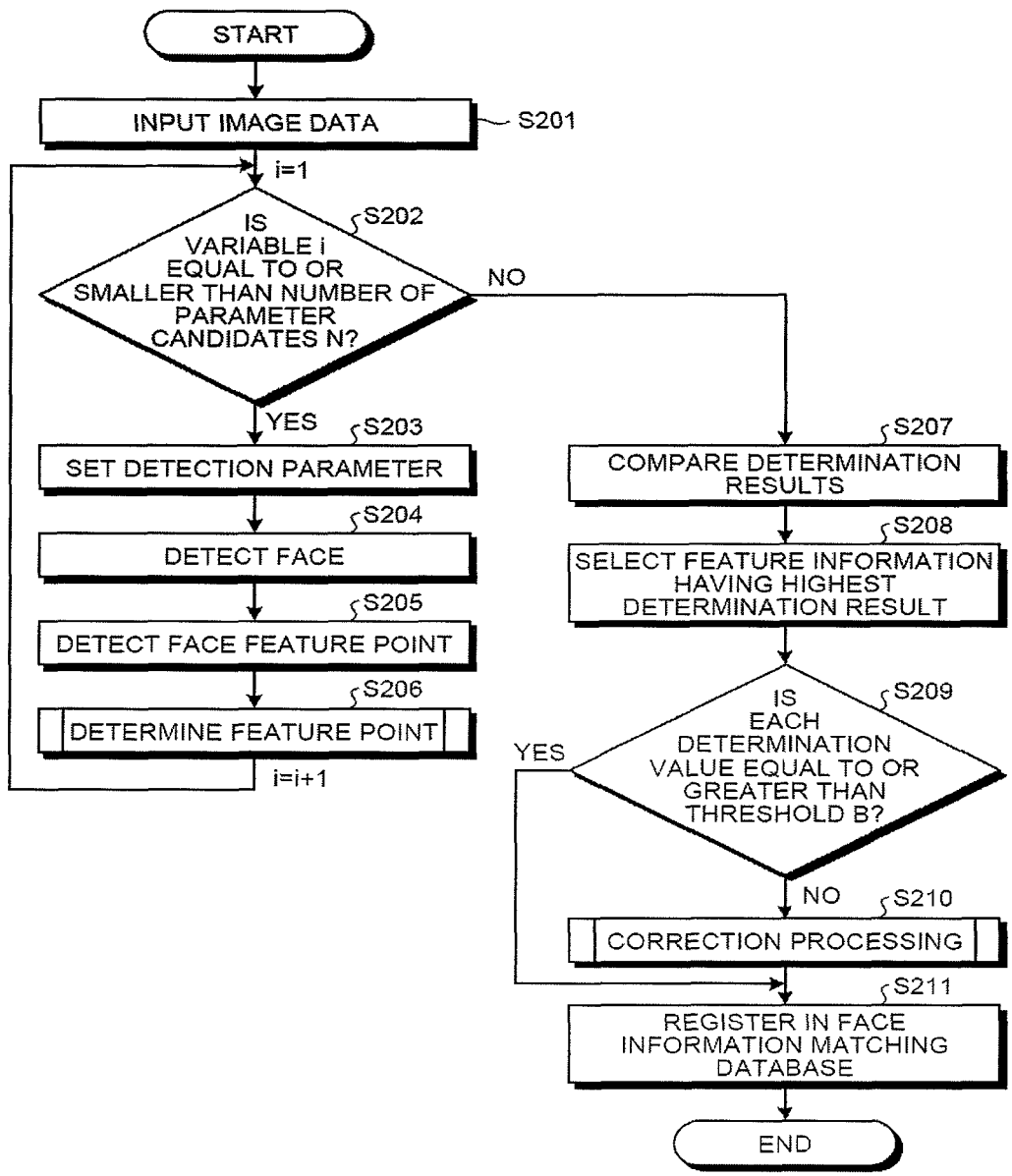
FIG. 2 is an exemplary flowchart illustrating a procedure for face detection processing in the biological information processor according to the first embodiment.

Next, face detection processing in the biological information processor 100 according to this embodiment will be described. FIG. 2 is a flowchart illustrating a procedure of the processing described above in the biological information processor 100 according to this embodiment.

First, the input unit 101 performs input processing on the image data captured by the camera 150 (S201).

Note that for a variable i, "1" is set as a default value. Then, the parameter setting unit 102 determines that the variable i is equal to or smaller than the number of parameter candidates "N" (S202).

Then, when determining that the variable i is equal to or smaller than the number of parameter candidates "N" (S202: Yes), the parameter setting unit 102 sets the detection parameter(s) corresponding to the variable i to each of the face detection unit 103 and the face feature information extraction unit 104 (S203).

After that, the face detection unit 103 detects the face area from the image data based on the set detection parameter(s) (S204).

Next, the face feature information extraction unit 104 extracts the face feature information from the image data (S205). After that, the feature information determination unit 105 determines the extraction precision of the extracted feature information (S206). In this embodiment, an evaluation value representing an extraction precision is calculated for each element. As the evaluation value, a variance of feature point coordinates may be used, for example. Note that a specific determination method will be described later.

After "1" is added to the variable i, the process returns to the processing in S202. Then, in S202, when it is determined that the variable i is greater than the number of parameter candidates "N" (S202: No), the feature information determination unit 105 compares the determination results of N types of feature information items (S207).

After that, the feature information determination unit 105 selects the feature information having the highest determination result from among the N types of feature information items (S208).

Then, the feature information determination unit 105 determines whether or not all the evaluation values of the selected feature information are equal to or greater than a predetermined threshold "B" (S209). Assuming that an appropriate value is set as the threshold "B" according to the embodiment, the description thereof is omitted. When there is no evaluation value equal to or smaller than the predetermined threshold "B" (S209: Yes), the process proceeds to S211.

When there is at least one evaluation value equal to or smaller than the predetermined threshold "B" (S209: No), the correction unit 106 performs correction to increase the determination value (S210).

After that, the output unit 107 registers, in a manner associated with each other, the feature information and the image data in the face information matching database (S211).

Figure 3:
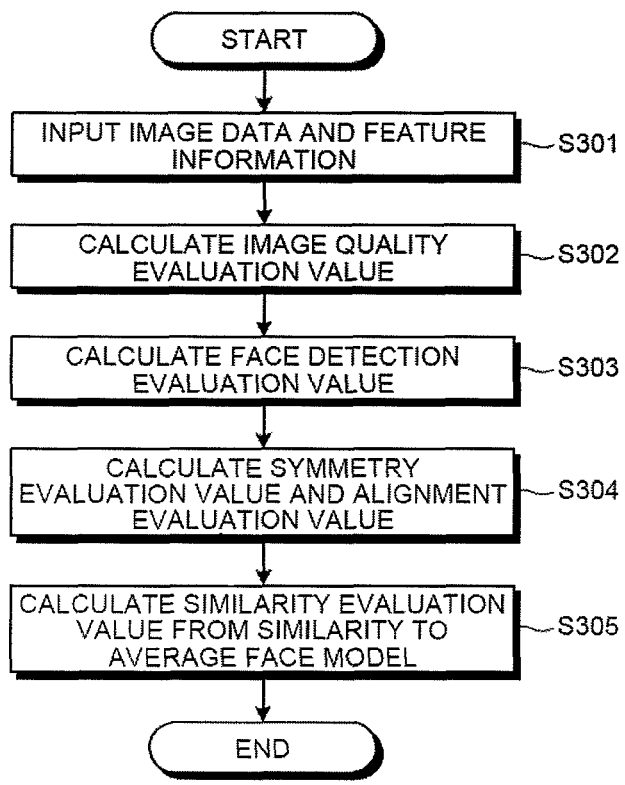
FIG. 3 is an exemplary flowchart illustrating a procedure for processing of calculating an evaluation value in a feature information determination unit according to the first embodiment.

Next, the processing of calculating the evaluation value in the feature information determination unit 105 according to this embodiment will be described. FIG. 3 is a flowchart illustrating a procedure for the processing in the feature information determination unit 105 according to this embodiment.

First, the feature information determination unit 105 performs input processing on the face feature information and the image data from which the feature information is extracted, from the face feature information extraction unit 104 (S301). The face area detected by the face detection unit 103 from among the image data items subjected to the input processing is also subjected to the input processing.

The feature information determination unit 105 calculates an image quality evaluation value for the image data (S302). In this embodiment, a contrast and a color distribution are used as an evaluation criterion for calculation of the image quality evaluation value. For example, the feature information determination unit 105 determines whether or not the contrast ratio satisfies the following expression (1) so as to evaluate the contrast.

$$\theta cont1 < (Lmax - Lmin)/(Lmax + Lmin) < \theta cont2 \quad (1)$$

Note that Lmax represents a maximum brightness value included in the face area; Lmin represents a minimum brightness value included in the face area; and θcont1 and θcont2 are predetermined thresholds.

As another example of the image quality evaluation, the feature information determination unit 105 extracts the frequency of colors of the face area, and determines whether or not the frequency satisfies the range of thresholds including an average or variance. Further, it may be determined whether or not the entire screen is black due to an extremely insufficient illuminance. Then, the feature information determination unit 105 outputs the determination results as the image quality evaluation value.

Figure 4:
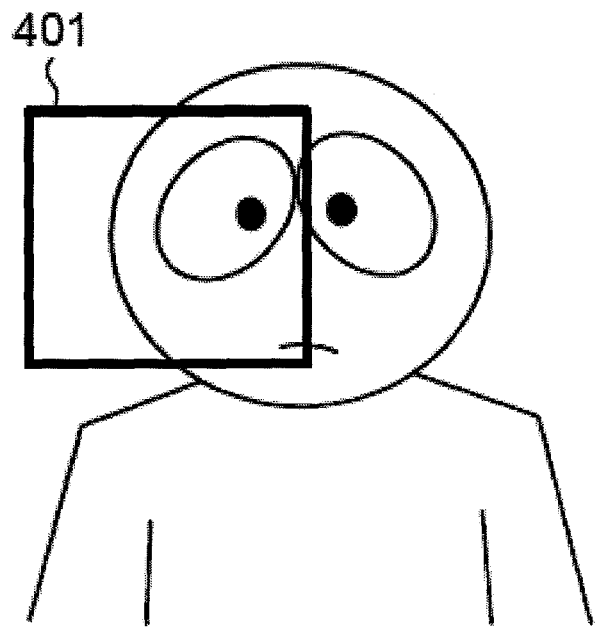
FIG. 4 is an exemplary diagram illustrating a misalignment of face detection.

Next, the feature information determination unit 105 calculates a face detection evaluation value (S303). In this embodiment, it is determined whether or not a misalignment occurs in the face detection, as evaluation of the face detection. FIG. 4 is a diagram illustrating a misalignment of face detection. In the example illustrated in FIG. 4, assume that an area 401 is erroneously detected as a face area.

In this embodiment, the feature information determination unit 105 determines the feature information based on whether or not the position (feature point) of the face characteristic portion extracted by the face feature information extraction unit 104 is included in the face area detected by the face detection unit 103. When the number of detected feature points is larger than the threshold, it is determined that the position detected as the face area is shifted. The feature information determination unit 105 outputs the determination result as the face detection evaluation value.

Further, the feature information determination unit 105 calculates a symmetry evaluation value and an alignment evaluation value (S304).

Figure 5:
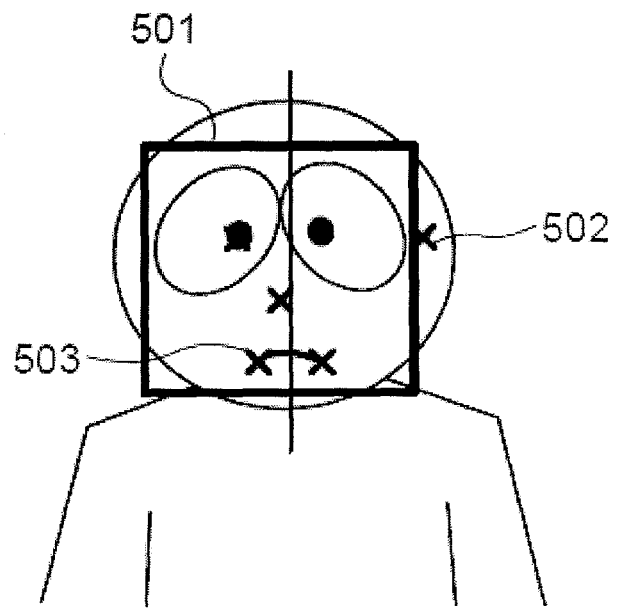
FIG. 5 is an exemplary diagram illustrating an example in which a misalignment occurs in detected feature points of both eyes.

The term "symmetry evaluation value" refers to a value obtained by determining whether symmetric components, like both eyes, are appropriately extracted in a symmetrical manner by the face feature information extraction unit 104. FIG. 5 is a diagram illustrating an example in which a misalignment occurs in the detected feature points of both eyes. In this embodiment, the feature information determination unit 105 confirms whether the left and right components are line-symmetrically arranged with a straight line 503 passing through the center of a face detection frame as a reference. Also in the example illustrated in FIG. 5, it can be confirmed that a feature point 501 represents the right eye; a feature point 502 represents the left eye; and the distance between the right eye from the straight line 503 is different from that between the left eye from the straight line 503. Specifically, the feature information determination unit 105 determines the feature information by using the following expression (2). Note that a variable n represents the number of face feature points detected from the face, and $w\_1, \ldots,$ and $w\_n$ are weighting parameters.

$$w\_1 \|x\_1 - y\_1\|\hat{2} + \ldots + w\_n \|x\_n - y\_n\|\hat{2} < \theta mirr \quad (2)$$

Each of $x\_1, \ldots,$ and $x\_n$ represents a coordinate of feature points on a first one side (for example, left side) when the face is divided into two parts by the straight line 503 described above. Each of $y\_1, \ldots,$ and $y\_n$ represents a coordinate of feature points on a second one side (for example, right side) when the face is divided into two parts by the straight line 503 described above, as a coordinate subjected to reflection on the first one side with respect to the straight line 503. Specifically, when the right and left feature points are arranged symmetrically, for example, $x\_1 - y\_1 = $ "0" holds. Assume that θmirr represents a predetermined threshold.

Note that a deviation of coordinates may be measured by Euclidean distance or by other distances such as one norm. As the weighting parameter, a value may be set to only components (for example, eyes) that are easily detected. In this manner, the execution of the appropriate weighting can improve the determination precision.

The feature information determination unit 105 may confirm the consistency indicating whether a deviation of each feature point from the average value falls within the threshold, by using the average value m of the positions of the feature points in the image data. The average value m is calculated from the following expression (3).

$$m = (x\_1 + \ldots + x\_n)/n \quad (3)$$

Then, the feature information determination unit 105 confirms the consistency indicating whether the deviation from the average falls within a certain threshold by using the following expression (4).

$$\text{Max}\{\|x\_1 - m\| \ldots \|x\_n - m\|\} < \theta ave \quad (4)$$

The feature information determination unit 105 may confirm the consistency from a relative positional relationship between the feature points. From n feature points, k (k=1, ..., n) feature points are selected (the selected k feature points are defined as $x\_1$ to $x\_k$ for ease of explanation), and a vector representing the relative positional relationship is calculated for all combinations of the feature points selected in the following expression (5).

$$x\_1 - x\_2, \ldots, x\_1 - x\_k, \ldots, x\_k - x\_\{k-1\} \quad (5)$$

The number of vectors calculated in the expression (5) is represented by k(k−1)/2. A probability distribution using the vector value as the probability variable is estimated based on prepared learning data, and a threshold θprob is set based on the estimation result. Further, the feature information determination unit 105 determines whether there is a misalignment, by using the following expression (6), and outputs it as a consistency evaluation value.

$$Pr(x\_1 - x\_2, \ldots, x\_1 - x\_k, \ldots, \\ x\_k - x\_\{k-1\}) < \theta prob \quad (6)$$

As a result of the expression (6), when the relative positions of the feature points are arranged at unlikely positions, it is determined that there is a misalignment, and the evaluation value based on the determination result is output.

Next, the feature information determination unit 105 calculates the similarity evaluation value based on the similarity to an average face model (S305). In the calculation of the similarity according to this embodiment, h average models (average faces) of a typical face image are obtained. The feature information determination unit 105 calculates similarities s_1, and s_h between these average models. After that, the feature information determination unit 105 performs determination of the following expression (7).

$$\max\{s\_1, \ldots, s\_k\} < \theta s \qquad (7)$$

When the expression (7) is satisfied, the face is not similar to any of the average faces. Accordingly, the feature information determination unit 105 determines that the detection processing is not properly carried out, and outputs the similarity evaluation value.

The feature information determination unit 105 according to this embodiment sets the evaluation values, which are calculated by quality evaluation, face detection evaluation, symmetry evaluation, alignment evaluation, relative alignment evaluation, and similarity evaluation, as $A\_1, \ldots, A\_m$. Then, a final evaluation value z of the detection processing is calculated from the following expression (8) based on the set evaluation value.

$$z = c \cdot A\_1 + \ldots + c\_m \cdot A\_m \qquad (8)$$

Weights c_1, and c_m may be determined by a method, such as regression analysis, on the basis of prepared learning data such as a detection result of a face image having a feature point detected as correct and a detection result of a face image having a feature point detected as false. When only a part of items are focused, "0" may be set to the weighting c_i corresponding to the value of the neglected item i.

When the threshold in each item is not satisfied, "−∞" is set as the evaluation value z. When determining that the evaluation value z does not exceed a threshold θz, the feature information determination unit 105 requests the correction unit 106 to correct the feature point, the image quality, or the like.

Figure 6:
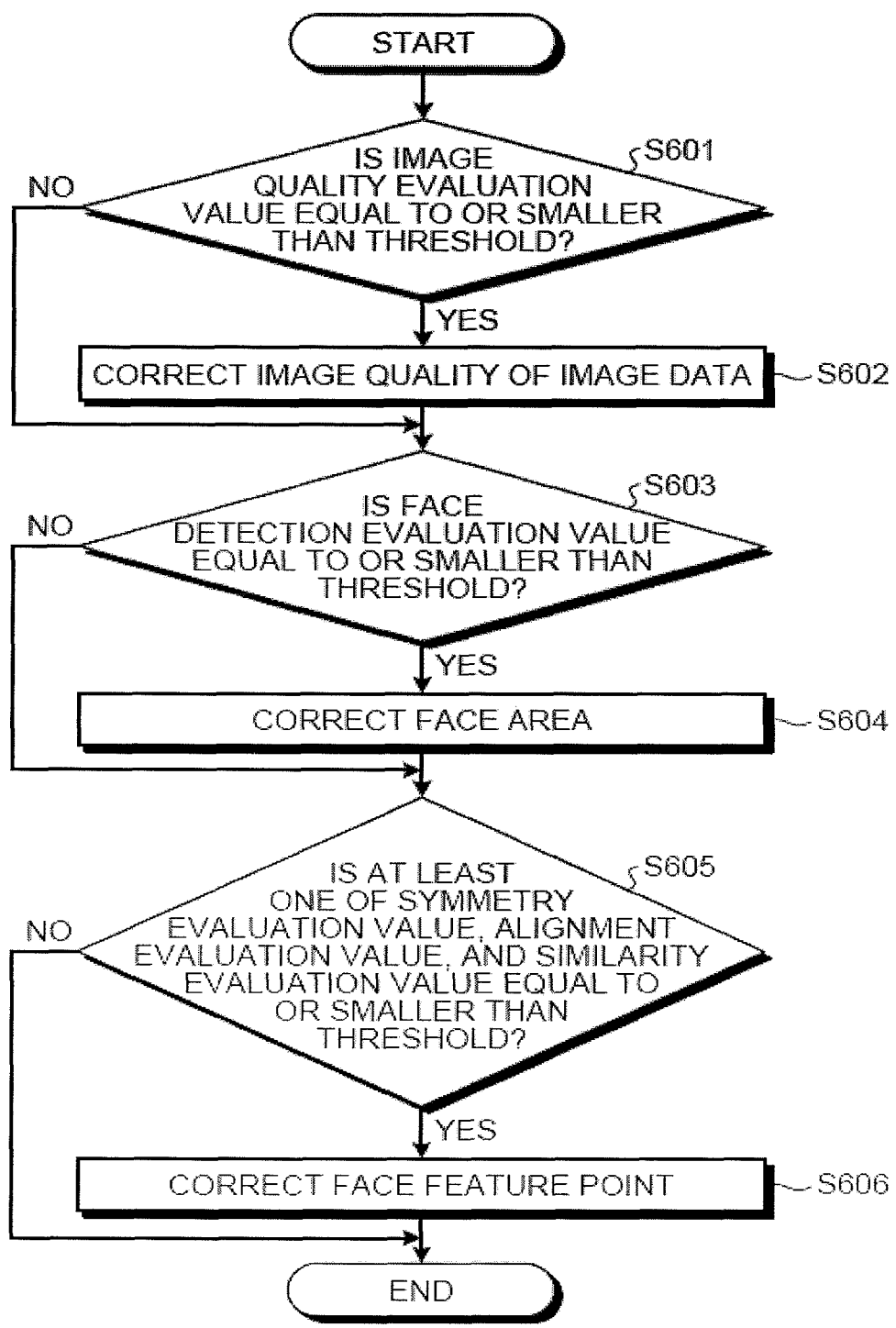
FIG. 6 is an exemplary flowchart illustrating a procedure for correction processing in a correction unit according to the first embodiment.
Figure 7:
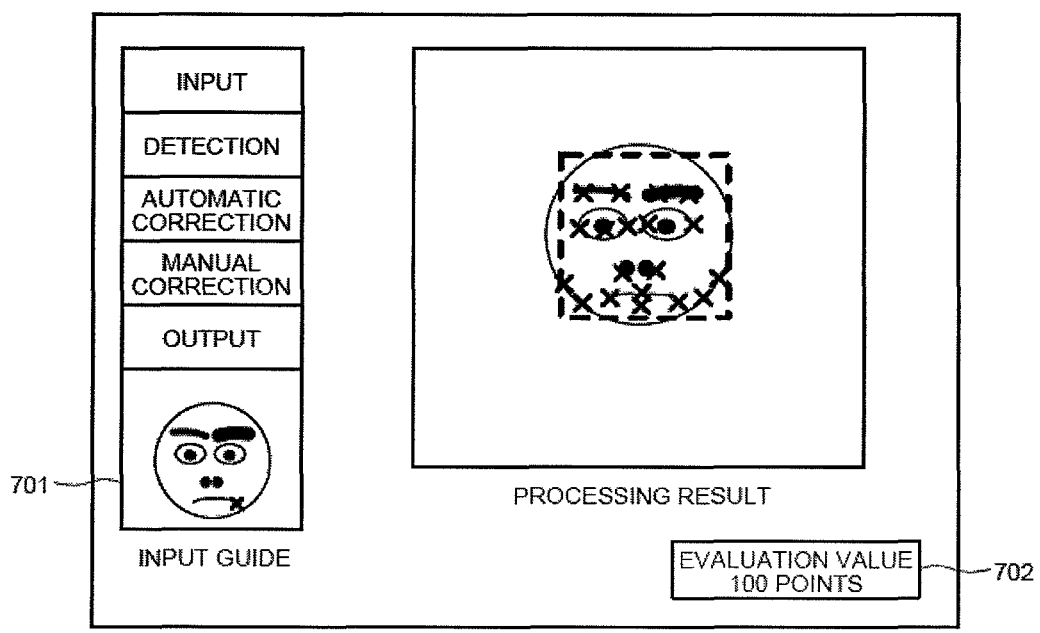
FIG. 7 is an exemplary diagram illustrating an example of an interface screen for correcting a detection result.

Next, the correction processing in the correction unit 106 according to this embodiment will be described. FIG. 6 is a flowchart illustrating a procedure for the processing in the correction unit 106 according to this embodiment. In the procedure for the processing illustrated in FIG. 6, an example of automatically performing the determination and correction is described. Alternatively, the determination and correction may be manually performed. Furthermore, only the correction of a deviation in the face detection may be manually performed, and other corrections may be automatically performed, for example. FIG. 7 is a diagram illustrating an example of an interface screen for correction of the detection result. The user may perform the correction while referring to the screen illustrated in FIG. 7. In this case, the feature point that causes a decrease in the evaluation value may be displayed as an input guide 701. Every time the user performs correction, the feature information determination unit 105 determines the extraction precision, the determination result is displayed in a field 702. Thus, in the case of performing the correction manually, when the user manipulates a mouse or a keyboard to perform the correction, the user can perform the correction work while visually observing the numerical value of the determination result displayed on the screen.

Referring back to FIG. 6, an example in which the correction unit 106 performs correction automatically will be described. First, the correction unit 106 determines whether the image quality evaluation value is equal to or smaller than the threshold (S601). When the image quality evaluation value is larger than the threshold (S601: No), no particular processing is carried out before S603.

When the correction unit 106 determines that the image quality evaluation value is equal to or smaller than the threshold (S601: Yes), the image data is corrected (S602). Examples of the correction method include gradation adjustment, contrast elongation, and brightness change of image data. As correction of other image qualities, rotation correction and scaling processing can also be performed.

After that, the correction unit 106 determines whether or not the face detection evaluation value is equal to or smaller than the threshold (S603). When it is determined that the face detection evaluation value is larger than the threshold (S603: No), no processing is carried out before S605.

Then, when the correction unit 106 determines that the face detection evaluation value is equal to or smaller than the threshold (S603: Yes), the correction unit 106 corrects the face area (S604).

After that, the correction unit 106 determines whether at least one of a symmetry evaluation value, an alignment evaluation value, and a similarity evaluation value is equal to or smaller than a threshold (S605). When it is determined that all the values are greater than the threshold (S605: No), the processing is ended.

Then, when the correction unit 106 determines that at least one of the symmetry evaluation value, the alignment evaluation value, and the similarity evaluation value is equal to or smaller than the threshold (S605: Yes), the correction unit 106 corrects the face feature point (S606).

Various corrections are carried out by the processing procedure described above. In the automatic correction processing, after all corrections are finished, when the feature information determination unit 105 determines that the feature information is appropriate, the feature point is registered in the face information matching database 160. When it is determined as inappropriate, the user performs correction processing manually.

The output unit 107 of the biological information processor 100 according to this embodiment may output one or more image data items of a captured face, or a moving image to be associated with the face feature information so that the identification result can be visually determined.

Modified Example of First Embodiment

Figure 8:
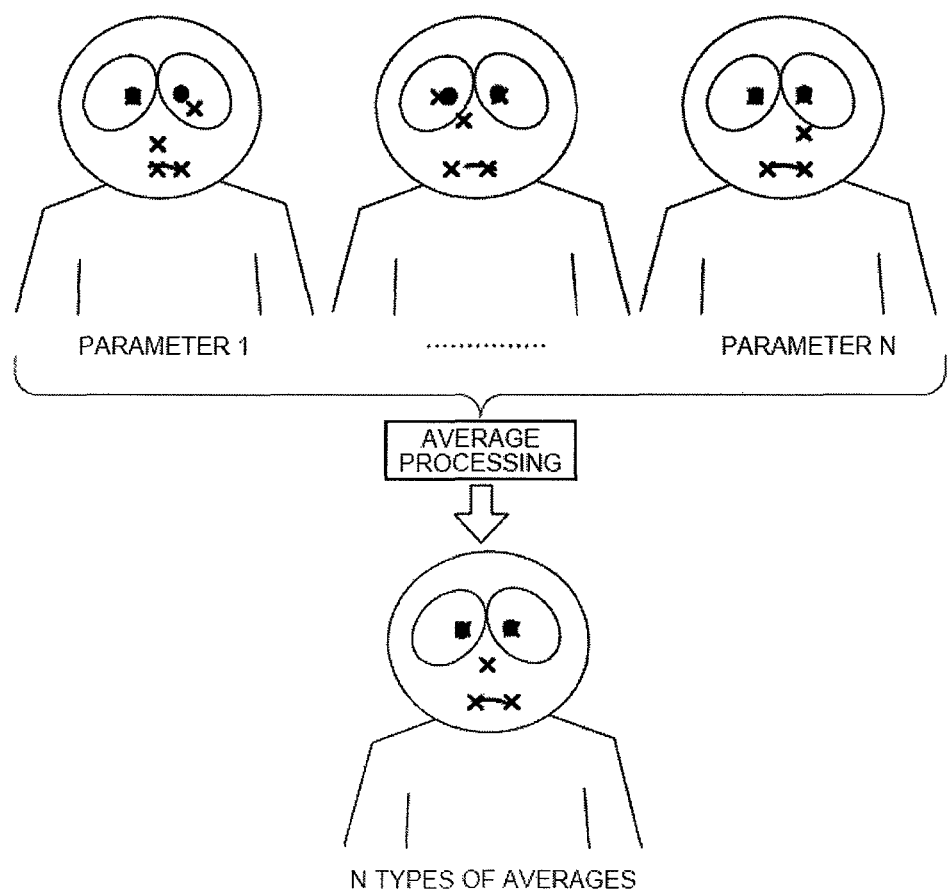
FIG. 8 is an exemplary diagram illustrating a feature point extraction method of a face feature information extraction unit according to a modified example.

In this embodiment, the feature information having the highest evaluation value is selected from among the extracted feature information items by using N types of detection parameters. However, the method of extracting the feature information is not limited to such a method. FIG. 8 is a diagram illustrating the feature point extraction method of the face feature information extraction unit 104 according to a modified example.

As illustrated in FIG. 8, the face feature information extraction unit 104 extracts N types of feature information items by using N types of detection parameters. After that, the face feature information extraction unit 104 performs average processing on the extracted N types of feature information items, and extracts averaged feature information.

Moreover, as a method different from the method of this embodiment for specifying the position of the portion, a method of estimating other component positions by applying a component model of a face from a part of feature points may be employed.

As described above, in the case of registering a large number of feature information items based on the biological information, such as an image for face authentication, into a database, the biological information processor 100 according to this embodiment determines the extraction precision of the feature information. This enables registration of excellent feature information with high efficiency. This alleviates a reduction in the matching precision due to the registered feature information.

Second Embodiment

A second embodiment illustrates an example in which the face image data for test is input and the feature information of the face information matching database is verified using the input face image data.

Figure 9:
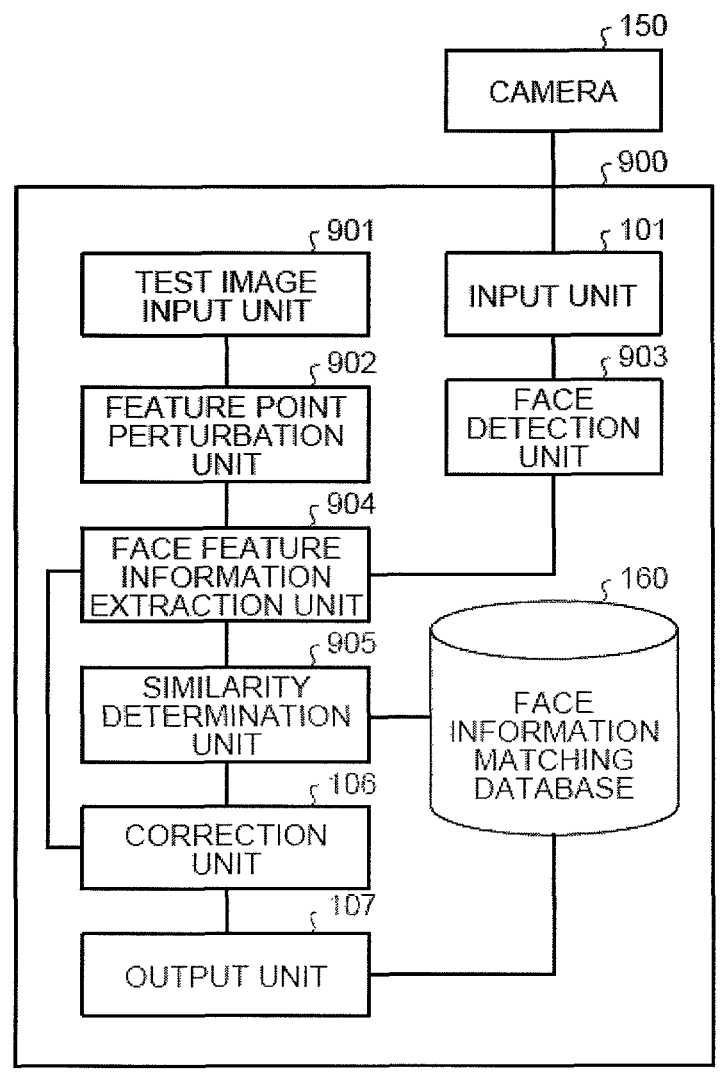
FIG. 9 is an exemplary block diagram illustrating a configuration of a biological information processor according to a second embodiment.

FIG. 9 is a block diagram illustrating a configuration of a biological information processor according to the second embodiment. A biological information processor 900 according to this embodiment differs from the biological information processor 100 according to the first embodiment described above in the following respects. That is, a test image input unit 901 and a feature point perturbation unit 902 are added. The feature information determination unit 105 is replaced by a similarity determination unit 905 that executes processing different from that of the feature information determination unit 105. The face detection unit 103 and the face feature information extraction unit 104 are respectively replaced by a face detection unit 903 and a face feature information extraction unit 904 which execute processing different from those of the face detection unit 103 and the face feature information extraction unit 104. In the following description, the components identical with those of the first embodiment described above are denoted by the same reference numerals, and the description thereof is omitted.

The face detection unit 903 and the face feature information extraction unit 904 are similar to the face detection unit 103 and the face feature information extraction unit 104 according to the first embodiment, except that parameter setting is not performed by the parameter setting unit 102.

Specifically, the input unit 101 inputs the image data captured by the camera 150, and the face detection unit 903 detects the face area. Further, the face feature information extraction unit 104 extracts feature information and the correction unit 106 performs correction manually or automatically as needed. After that, the output unit 107 registers the feature information in the face information matching database 160.

This embodiment illustrates an example in which one type of feature information is generated without generating the N types of feature information. Instead, the biological information processor 900 according to this embodiment intentionally generates erroneous feature information from face image data for test, and compares the feature information with the feature information already registered, thereby determining the extraction precision of the feature information already registered.

This embodiment illustrates an example of extracting the feature information from the face. Not only the processing specialized in a face, but also a method of searching a person from image data representing various biological information items is also applicable. Examples of the biological information include an iris, a retina, a vein pattern of a hand or a finger, a fingerprint pattern, or a state of an eye, an ear, or a mouth. The same holds true for the following embodiments.

The test image input unit 901 performs input processing on the face image data for test.

Figure 10:
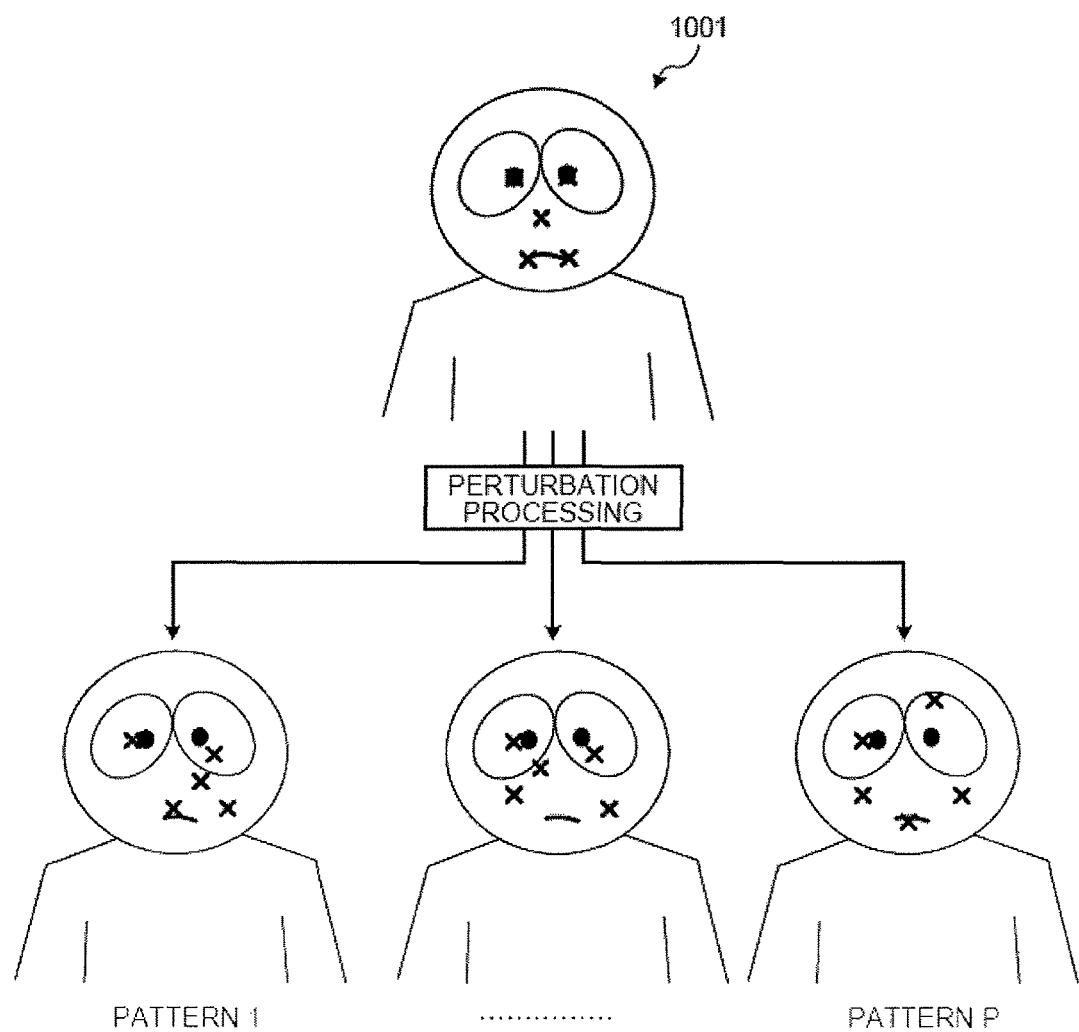
FIG. 10 is an exemplary diagram illustrating perturbation of feature points by a feature point perturbation unit according to the second embodiment.

The feature point perturbation unit 902 allows the position of the feature point, which is detected manually or automatically from the face image data for test, to be perturbed. FIG. 10 is a diagram illustrating the perturbation of feature points by the feature point perturbation unit 902. As illustrated in FIG. 10, the feature point perturbation unit 902 sets various types of feature point sets including feature points having positions different from the position, based on a correctly detected feature point set 1001 (in the example illustrated in FIG. 10, P types).

As the perturbation method, input feature point coordinates $X_n$ can be randomly perturbed to $X_n+E_n$ by a probability variable $E_n$ that follows a probability distribution such as a Gaussian distribution. Further, other probability distributions may be used, and manual perturbation may be performed.

The face feature information extraction unit 904 further extracts the feature information for each feature point set perturbed by the feature point perturbation unit 902.

The similarity determination unit 905 compares the feature information registered in the face information matching database 160 with the feature information generated based on the perturbed feature point, and determines the extraction precision of the feature information registered in the face information matching database 160.

In the similarity determination unit 905 according to this embodiment, the feature information registered in the face information matching database 160 is compared with the feature information based on the perturbed feature point. When the similarity is equal to or greater than a predetermined threshold, it is determined that the feature information is erroneously extracted. In other words, since the feature information is similar to erroneous feature information, it can be considered that an error is likely to occur also in the feature information registered in the face information matching database 160.

The feature information which is determined as erroneous and registered in the face information matching database 160 is corrected by the correction unit 106.

Figure 11:
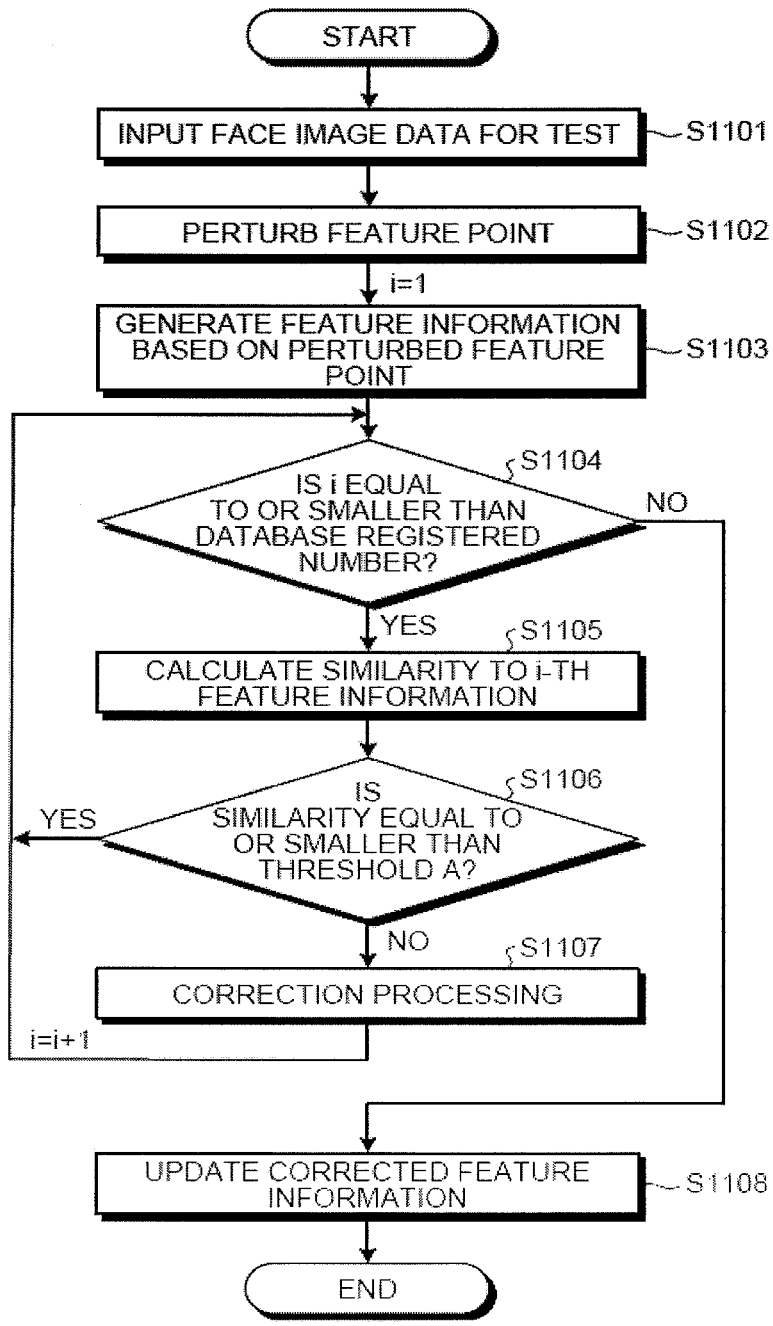
FIG. 11 is an exemplary flowchart illustrating a procedure for processing of determining a similarity between feature information items in the biological information processor according to the second embodiment.

Next, the similarity determination processing between feature information items in the biological information processor 900 according to this embodiment will be described. FIG. 11 is a flowchart illustrating a procedure for the processing in the biological information processor 900 according to this embodiment.

First, the test image input unit 901 performs input processing on the face image data for test (S1101). Next, the feature point perturbation unit 902 performs perturbation of the feature points detected from the face image data for test subjected to the input processing (S1102).

After that, the face feature information extraction unit 904 generates feature information based on the perturbed feature point (S1103).

Then, the similarity determination unit 905 determines whether or not the variable i is equal to or smaller than the number of persons registered in the face information matching database 160 (S1104). Note that the default value of the variable i is "0".

Then, when the similarity determination unit 905 determines that the variable i is equal to or smaller than the number of registered persons (S1104: Yes), the similarity between the feature information of the i-th registered person and the feature information based on the perturbed feature point is calculated (S1105). When p types of feature information items based on the perturbed feature point are generated, the similarity for each feature information is calculated.

After that, the similarity determination unit 905 determines whether or not the calculated similarity is equal to or smaller than a predetermined threshold A (S1106). When it is determined that the similarity is equal to or smaller than the threshold A (S1106: Yes), the processing is carried out again from S1104.

On the other hand, when the similarity determination unit 905 determines that the similarity is greater than the threshold A (S1106: No), the correction unit 106 performs correction processing (S1107). Note that the correction processing is similar to that of the first embodiment, so the description thereof is omitted.

In S1104, when the similarity determination unit 905 determines that the variable i is greater than the number of registered persons (S1104: No), the output unit 107 updates the face information matching database 160 by using the feature information corrected by the correction unit 106 (S1108).

The processing procedure described above enables detection and correction of erroneously extracted feature information among the feature information items registered in the face information matching database 160. This enables improvement of the matching precision.

According to the first and second embodiments, the provision of the configuration described above enables recognition of the extraction precision of the face feature information. This enables correction for improving the extraction precision, for example.

Third Embodiment

Figure 12:
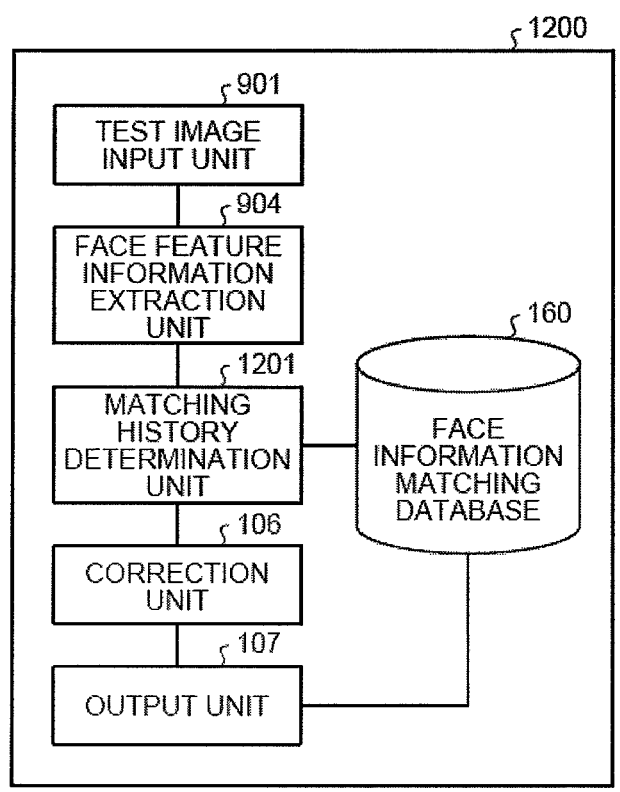
FIG. 12 is an exemplary block diagram illustrating a configuration of a biological information processor according to a third embodiment.

FIG. 12 is a block diagram illustrating a configuration of a biological information processor 1200 according to a third embodiment. The biological information processor 1200 according to this embodiment differs from the biological information processor 900 according to the second embodiment described above in that the input unit 101, the feature point perturbation unit 902, the face detection unit 903, and the similarity determination unit 905 are removed and a matching history determination unit 1201 is added. In the following description, components identical with those of the second embodiment described above are denoted by the same reference numerals, and the description thereof is omitted.

The test image input unit 901 performs input processing on the face image data used for a matching test.

The matching history determination unit 1201 determines the extraction precision of the feature information based on the history of search ranks.

Figure 13:
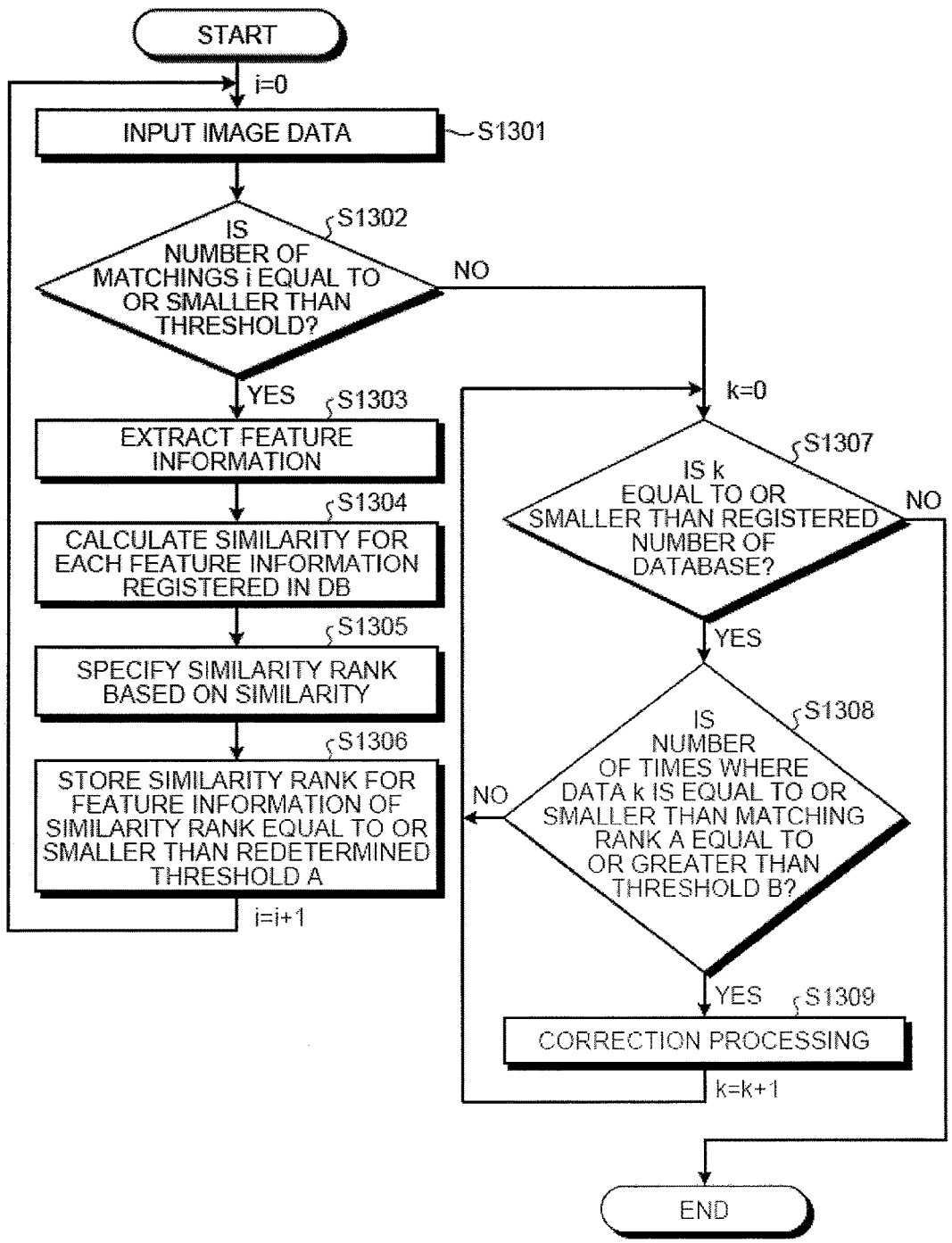
FIG. 13 is an exemplary flowchart illustrating a procedure for processing of determining an extraction precision of feature information in the biological information processor according to the third embodiment.

Next, the processing of determining the extraction precision of the feature information in the biological information processor 1200 according to this embodiment will be described. FIG. 13 is a flowchart illustrating the above-described procedure for the processing in the biological information processor 1200 according to this embodiment. Note that the default value of the number of matchings i is "0".

First, the test image input unit 901 performs input processing on the face image data (S1301). Next, the matching history determination unit 1201 determines whether or not the number of matchings i is equal to or smaller than the threshold (S1302).

When the matching history determination unit 1201 determines that the number of matchings i is equal to or smaller than the threshold (S1302: Yes), the face feature information extraction unit 904 extracts the feature information from the face image data subjected to the input processing (S1303).

Next, the matching history determination unit 1201 calculates the similarity to the feature information extracted in S1303 for each feature information registered by the face information matching database 160 (S1304).

Then, the matching history determination unit 1201 specifies a similarity rank of each feature information registered in the face information matching database 160, according to the calculated similarity (S1305).

Moreover, the matching history determination unit 1201 stores the similarity rank for the feature information having a similarity rank equal to or lower than the predetermined threshold A (S1306). After that, processing is carried out from S1301 again.

On the other hand, in S1302, when the matching history determination unit 1201 determines that the number of matchings i is greater than the threshold (S1302: No), the specific processing of the similarity rank is ended, and the process proceeds to S1307.

The matching history determination unit 1201 determines whether or not a variable k is equal to or smaller than the number of registrations in the face information matching database 160 (S1307). Note that the default value of the variable k is "0".

When determining that the variable k is equal to or smaller than the number of registrations in the face information matching database 160 (S1307: Yes), the matching history determination unit 1201 determines whether or not the number of times where the matching ranks for data k are equal to or lower than the threshold A is equal to or greater than a threshold B (S1308). When it is determined that the number of times is not equal to the threshold B (S1308: No), "1" is added to the variable k and processing is carried out from S1307.

When the matching history determination unit 1201 determines that the number of times is equal to or more than the threshold B (S1308: Yes), the correction unit 106 carries out correction (S1309).

On the other hand, when the matching history determination unit 1201 determines that the variable k is greater than the number of registrations in the face information matching database 160 (S1307: No), the processing is ended.

The biological information processor 1200 according to this embodiment has the configuration described above, which enables detection and correction of abnormal data in the face information matching database 160 and improvement of the matching precision.

Fourth Embodiment

Figure 14:
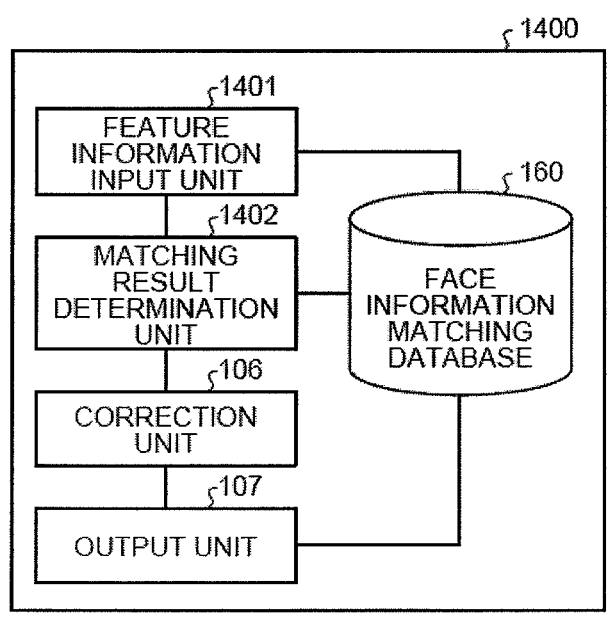
FIG. 14 is an exemplary block diagram illustrating a configuration of a biological information processor according to a fourth embodiment.

FIG. 14 is a block diagram illustrating a configuration of a biological information processor 1400 according to a fourth embodiment. The biological information processor 1400 according to this embodiment differs from the biological information processor 900 according to the second embodiment described above in the following respects That is, the test image input unit 901 is replaced by a feature information input unit 1401 that executes processing different from that of the test image input unit 901. The matching history determination unit 1201 is replaced by a matching result determination unit 1402 that executes processing different from that of the matching history determination unit 1201. The face feature information extraction unit 904 is removed. In the following description, the components identical with those of the second embodiment described above are denoted by the same reference numerals, and the description thereof is omitted.

This embodiment illustrates an example in which determination is performed based on the similarity between feature information items of the image data registered in the face information matching database 160.

The feature information input unit 1401 performs processing of inputting image data and feature information from the face information matching database 160.

Then, the matching result determination unit 1402 calculates a similarity between feature information items of the image data of the face information matching database 160, and determines the extraction precision of the feature information based on the similarity. Assume that all or a part of pairs in the face information matching database 160 are compared with each other.

Figure 15:
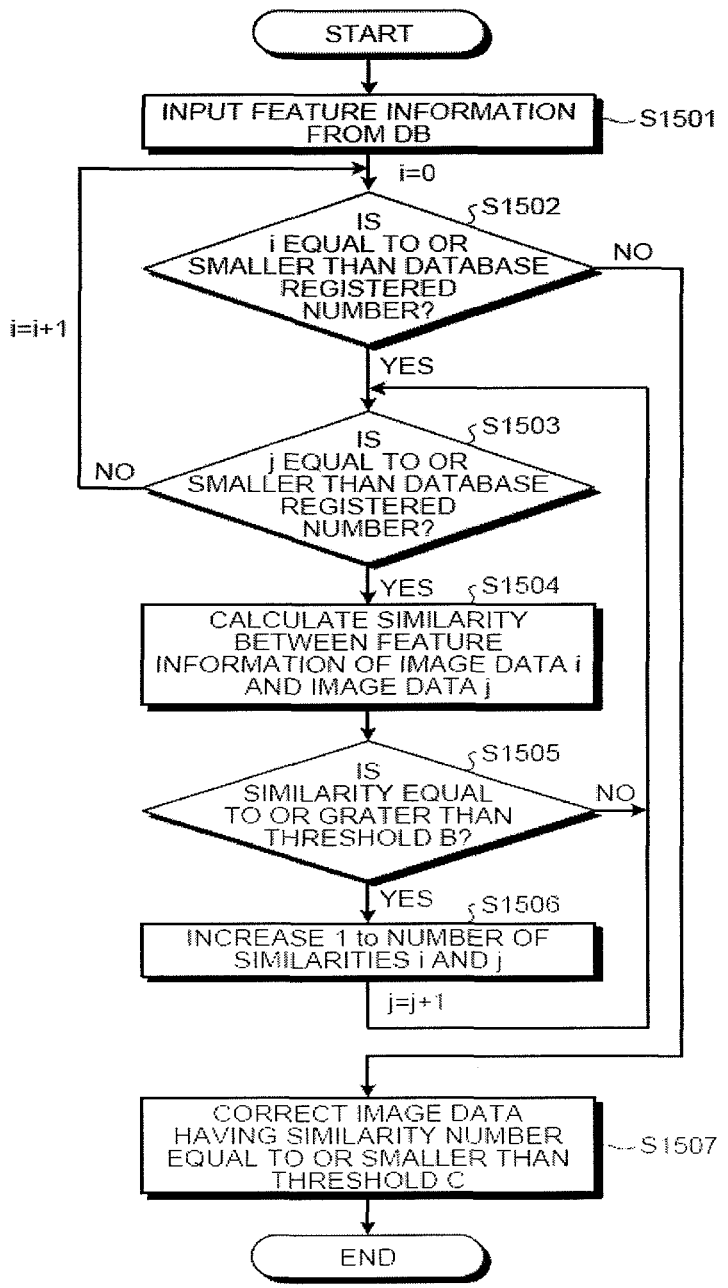
FIG. 15 is an exemplary flowchart illustrating a procedure for processing of determining an extraction precision of feature information in the biological information processor according to the fourth embodiment.

Next, the processing of determining the extraction precision of the feature information in the biological information processor 1400 according to this embodiment will be described. FIG. 15 is a flowchart illustrating a procedure for the processing in the biological information processor 1400 according to this embodiment. Note that the default value of the number of matchings i is "0".

First, the feature information input unit 1401 performs input processing on the image data and the feature information associated with the image data from the face information matching database 160 (S1501). Note that this embodiment illustrates an example in which the biological information processor 1400 includes a face information matching database 160, and the face information matching database 160 may be provided outside the biological information processor 1400. Note that the default value of the variable i is "0".

Next, the matching result determination unit 1402 determines whether or not the variable i is equal to or smaller than the number of registrations in the face information matching database 160 (S1502).

When determining that the variable i is equal to or smaller than the number of registrations in the face information matching database 160 (S1502: Yes), the matching result determination unit 1402 determines whether or not a variable j is equal to or smaller than the number of registrations in the face information matching database 160 (S1503).

When the matching result determination unit 1402 determines that the variable j is equal to or smaller than the number of registrations in the face information matching database 160 (S1503: Yes), a similarity between feature information of the i-th image data of the face information matching database 160 and feature information of the j-th image data of the face information matching database 160 is calculated (S1504).

After that, the matching result determination unit 1402 determines whether or not the calculated similarity is equal to or greater than the predetermined threshold B (S1505). When it is determined that the similarity is smaller than the threshold B (S1505: No), "1" is added to the variable j and processing is carried out from S1503.

On the other hand, when the matching result determination unit 1402 determines that the calculated similarity is equal to or greater than the predetermined threshold B (S1505: Yes), "1" is added to the number of similarities of the i-th image data and to the number of similarities of the j-th image data (S1506). After that, "1" is added to the variable j and processing is carried out from S1503. Note that the number of similarities is held for each image data and the default value thereof is "0".

Then, in S1503, when the matching result determination unit 1402 determines that the variable j is greater than the number of registrations in the face information matching database 160 (S1503: No), "1" is added to the variable i and the processing from S1502 is carried out.

Furthermore, in S1502, when the matching result determination unit 1402 determines that the variable i is greater than the number of registrations in the face information matching database 160 (S1502: No), the number of similarities calculated for each image data is referred to and the image data having the number of similarities equal to or lower than a threshold C is corrected by the correction unit 106 (S1507).

The processing procedure described above enables detection and correction of abnormal data in the face information matching database 160 and improvement in the matching precision.

Note that this embodiment illustrates the case of determining the similarity of the feature information within one database, but the similarity of the feature information may be determined between a plurality of databases.

As described above, according to the first to fourth embodiments, upon registration of a large number of biological information items such as images for face authentication in a database, confirmation and correction of the detection result of the feature information are automatically performed, thereby enabling satisfactory registration in the database with efficiency and reduction in misinformation during matching. The confirmation and correction of the detection result of the feature information are performed automatically also on a large number of biological information items already registered in the database, thereby enabling reduction in misinformation during matching.

Figure 16:
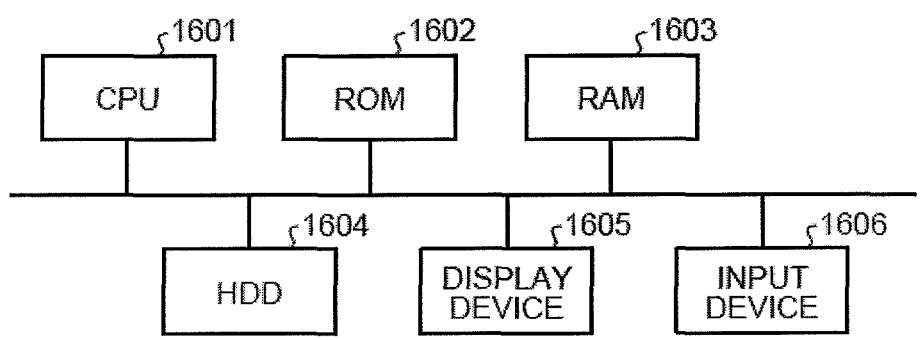
FIG. 16 is an exemplary diagram illustrating a hardware configuration of a biological information processor according to first to fourth embodiments.

FIG. 16 is a diagram illustrating a hardware configuration of a biological information processor according to the embodiment described above. As illustrated in FIG. 16, the biological information processor of the embodiment described above includes a CPU 1601, a ROM (Read Only Memory) 1602, a RAM 1603, an HDD 1604, a display device 1605 such as a display device, and an input device 1606 such as a keyboard or a mouse, and has a hardware configuration using a typical computer.

The biological information processing program to be executed by the biological information processor of the embodiment described above is provided in a form recorded in a computer-readable recording medium, such as a CD-ROM, flexible disk (FD), a CD-R, or a DVD (Digital Versatile Disk) with an installable format or executable format file.

The biological information processing program to be executed by the biological information processor of the embodiment described above may be configured to be stored on a computer connected to a network, such as the Internet, and to be provided by being downloaded via the network. Alternatively, the biological information processing program to be executed by the biological information processor of the embodiment described above may be configured to be provided or distributed via a network such as the Internet.

Further, a biological information processing program to be executed by the biological information processor of the embodiment described above may be configured and provided to be incorporated into a ROM or the like.

The biological information processing program to be executed by the biological information processor of the embodiment described above has a module configuration including the units described above. As actual hardware, the CPU 1601 reads the biological information processing program from the recording medium described above, and executes the biological information processing program, so that each unit is loaded onto a main storage device and each component is generated in the RAM 1603.

A biological information processor set forth in Supplementary note 1 includes an area detection unit that detects an area in which a person is displayed, from image information; a feature extraction unit that extracts feature information based on a characteristic portion of the person from the area detected by the area detection unit from the image information; and a determination unit that determines an extraction precision indicating whether or not the characteristic portion of the person can be extracted, with respect to the feature information extracted by the feature extraction unit, based on a position of the characteristic portion.

The biological information processor set forth in Supplementary note 1, the determination unit further calculates a symmetry from a predetermined reference of a plurality of positions representing the characteristic portion of the person, and determines the extraction prevision based on the symmetry.

The biological information processor set forth in Supplementary note 1 further includes a correction unit that corrects the image information when the extraction precision determined by the determination unit is lower than a predetermined threshold. The feature extraction unit extracts feature information from the corrected image information, and the determination unit performs determination based on the feature information corrected by the correction unit.

In the biological information processor set forth in Supplementary note 3, the correction unit performs contrast elongation, scaling, or rotation correction of the image information, or correction of the position of the characteristic portion of the person included in the image information.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A biological information processor comprising:
at least one processor configured
to detect an area in which a person is displayed from image information,
to extract, from the detected area, feature information which is based on a characteristic portion of a person,
to perturb a position of a characteristic point detected in test image information to set a perturbation feature point group indicating positions different from the position where the characteristic point is detected as feature points,
to extract second feature information from the perturbation feature point group,
to determine, based on the image information, the detected area and a position of the characteristic portion of the extracted feature information, an extraction precision of the feature information indicating whether the characteristic portion of the person is correctly extracted,
to calculate a similarity between the feature information and the second feature information indicating a position different from the position where the characteristic portion is detected as a feature,
to determine, if the similarity is equal to or larger than a predetermined threshold, that the extraction precision of the feature information indicates that the characteristic portion is not correctly extracted, and
to correct, if the extraction precision indicates that the characteristic portion is not correctly extracted, at least the detected area among the image information, the detected area, and the feature information without re-detecting the area and re-extracting the feature information so that the extraction precision is increased.

2. The biological information processor according to claim 1, further comprising a storage configured to store prepared image information for comparison in which a person is displayed,
wherein the at least one processor is configured to generate normalized image information obtained by extracting the area in which the person is displayed from the image information with the position of the characteristic portion of the person as a reference, and compare the generated normalized image information with the image information for comparison stored in the storage to determine the extraction precision.

3. The biological information processor according to claim 1, wherein the at least one processor is configured to calculate at least one of a centroid of the image information based on a plurality of the positions of a plurality of the characteristic portions of the person and a distance between the positions, and determine the extraction precision based on whether or not the at least one of the centroid and the distance calculated is higher than a predetermined threshold.

4. The biological information processor according to claim 1, wherein the at least one processor is configured to extract feature information based on a position representing one of a face, a mouth, an iris, retina, an ear, a vein shape of a part of a human body, a fingerprint, and a palm print of the person included in the detected area.

5. The biological information processor according to claim 1, wherein the image information is one of image information captured by an image capturing unit and the image information stored in a storage used for authentication of a person.

6. The biological information processor according to claim 1, wherein the at least one processor is configured to display a screen for correction of the at least one of the image information, the detected area, and the feature information.

7. The biological information processor according to claim 1, wherein
the at least one processor further calculates a first evaluation value based on the image information, a second evaluation value based on the detected area and the position of the characteristic portion of the extracted feature information, and a third evaluation value based on the position of the characteristic portion of the extracted feature information, the at least one processor is configured to determine the extraction precision of the feature information based on the first evaluation value, the second evaluation value, and the third evaluation value, and the at least one processor is configured to correct, if the extraction precision indicates that the characteristic portion is not correctly extracted, the at least the detected area among the image information, the detected area, and the feature information without re-detecting the area and re-extracting the feature information so that at least one of the first evaluation value, the second evaluation value, and the third evaluation value is increased.

* * * * *